US012646770B2

(12) United States Patent
Park et al.

(10) Patent No.: US 12,646,770 B2
(45) Date of Patent: Jun. 2, 2026

(54) CYLINDRICAL SECONDARY BATTERY HAVING AN ELECTRODE WITH A MULTI-TAB CONFIGURATION

(71) Applicant: Samsung SDI Co., Ltd., Yongin-si (KR)

(72) Inventors: Jung Hyun Park, Yongin-si (KR); Joo Youn Shin, Yongin-si (KR); Joung Ku Kim, Yongin-si (KR); Jung Hyun Kim, Yongin-si (KR); Dong Sub Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 652 days.

(21) Appl. No.: 18/145,431

(22) Filed: Dec. 22, 2022

(65) Prior Publication Data

US 2023/0238615 A1 Jul. 27, 2023

(30) Foreign Application Priority Data

Jan. 27, 2022 (KR) ........................ 10-2022-0012597

(51) Int. Cl.
H01M 50/107 (2021.01)
H01M 10/0585 (2010.01)
(Continued)

(52) U.S. Cl.
CPC ..... H01M 50/107 (2021.01); H01M 10/0585 (2013.01); H01M 10/0587 (2013.01);
(Continued)

(58) Field of Classification Search
CPC ............. H01M 50/107; H01M 50/152; H01M 50/533; H01M 50/543; H01M 50/536; H01M 10/0585; H01M 10/0587
See application file for complete search history.

(56) References Cited

U.S. PATENT DOCUMENTS 7,286,335 B2    10/2007  Hozumi et al.
2006/0187615 A1    8/2006  Hozumi et al.
(Continued)

FOREIGN PATENT DOCUMENTS

DE    10 2008 034 872 A1    1/2010
EP    2 728 647 B1    10/2018
(Continued)

OTHER PUBLICATIONS

EPO machine generated English translation of KR-20170009592-A (Year: 2017).*
(Continued)

*Primary Examiner* — Kimberly Wyluda
(74) *Attorney, Agent, or Firm* — Womble Bond Dickinson (US) LLP

(57) ABSTRACT

A cylindrical secondary battery includes: an electrode assembly including a positive electrode plate having a positive electrode multi-tab, a separator, and a negative electrode plate having a negative electrode multi-tab, the positive electrode plate, the separator, and the negative electrode plate being laminated and wound; a cylindrical can accommodating the electrode assembly; a cap plate coupled at an upper end of the cylindrical can and being electrically connected to the negative electrode multi-tab; and a positive electrode terminal protruding upwardly through the cap plate and being electrically connected to the positive electrode multi-tab.

9 Claims, 4 Drawing Sheets

(51) Int. Cl.

| | |
|---|---|
| *H01M 10/0587* | (2010.01) |
| *H01M 50/152* | (2021.01) |
| *H01M 50/533* | (2021.01) |
| *H01M 50/536* | (2021.01) |
| *H01M 50/543* | (2021.01) |

(52) U.S. Cl.
CPC ....... *H01M 50/152* (2021.01); *H01M 50/533* (2021.01); *H01M 50/536* (2021.01); *H01M 50/543* (2021.01)

(56) References Cited

U.S. PATENT DOCUMENTS

| | | | | |
|---|---|---|---|---|
| 2011/0067227 | A1* | 3/2011 | Sohn | H01M 10/0431 |
| | | | | 29/623.1 |
| 2013/0189569 | A1* | 7/2013 | Youm | H01M 10/0583 |
| | | | | 429/185 |
| 2018/0287104 | A1* | 10/2018 | Urushihara | H01M 50/188 |
| 2020/0144581 | A1 | 5/2020 | Thunot | |
| 2020/0343520 | A1* | 10/2020 | Jeong | H01M 50/533 |
| 2021/0203047 | A1 | 7/2021 | Haraguchi et al. | |
| 2024/0136674 | A1* | 4/2024 | Park | H01M 50/152 |

FOREIGN PATENT DOCUMENTS

| | | | | | |
|---|---|---|---|---|---|
| EP | 4 333 193 | A1 | 3/2024 | | |
| JP | 2004-178832 | A | 6/2004 | | |
| JP | WO2005/038837 | A1 | 4/2005 | | |
| JP | WO2019/082711 | A1 | 5/2019 | | |
| KR | 10-0880657 | B1 | 1/2009 | | |
| KR | 10-0984463 | B1 | 9/2010 | | |
| KR | 20170009592 | A | * 1/2017 | .......... | H01M 2/022 |
| WO | WO 2022/248253 | A1 | 12/2022 | | |

OTHER PUBLICATIONS

Extended European Search Report issued in corresponding European Patent Application No. 23153419.9, dated Jun. 10, 2024, 8 pages.

US Office Action dated Oct. 7, 2025, issued in U.S. Appl. No. 18/648,305 (20 pages).

* cited by examiner

CYLINDRICAL SECONDARY BATTERY HAVING AN ELECTRODE WITH A MULTI-TAB CONFIGURATION

CROSS-REFERENCE TO RELATED APPLICATION

This application claims priority to and the benefit of Korean Patent Application No. 10-2022-0012597, filed on Jan. 27, 2022, in the Korean Intellectual Property Office, the entire content of which is herein incorporated by reference.

BACKGROUND

1. Field

Aspects of embodiments of the present disclosure relate to a cylindrical secondary battery.

2. Description of the Related Art

Generally, a cylindrical secondary battery includes a cylindrical electrode assembly, a cylindrical can for accommodating the electrode assembly and an electrolyte, and a cap assembly coupled at an upper opening in the can and which facilitates electrically connecting an external structure (or device) and the electrode assembly.

The cylindrical secondary battery generally has a configuration in which the can has a negative polarity, the cap assembly has a positive polarity, and the can and cap assembly are insulated from each other by a gasket. In the case of a battery module including a plurality of cylindrical secondary batteries connected to each other, bus bars are generally connected to the upper and lower portions of the secondary batteries, which requires a complicated structure requiring a time-consuming manufacturing process.

The above information disclosed in this Background section is for enhancement of understanding of the background of the present disclosure, and therefore, it may contain information that does not constitute prior art.

SUMMARY

Embodiments of the present disclosure provide a cylindrical secondary battery in which a negative electrode and a positive electrode have a wide flat section on the same surface. Thus, when a plurality of cylindrical secondary batteries are electrically connected by bus bars, the bus bars can be more easily connected to the secondary batteries with a simplified structure.

Embodiments of the present disclosure also provide a cylindrical secondary battery in which positive and negative electrode multi-tabs are provided on the same surface of an electrode assembly to provide improved capacity compared to conventional electrode assemblies of the same height, and permitting high current transmission by increasing a contact area between tabs.

According to an embodiment of the present disclosure, a cylindrical secondary battery includes: an electrode assembly including a positive electrode plate having a positive electrode multi-tab, a separator, and a negative electrode plate having a negative electrode multi-tab, the positive electrode plate, the separator, and the negative electrode plate being laminated and wound; a cylindrical can accommodating the electrode assembly; a cap plate coupled at an upper end of the cylindrical can and being electrically connected to the negative electrode multi-tab; and a positive electrode terminal protruding upwardly through the cap plate and being electrically connected to the positive electrode multi-tab.

The electrode assembly may have a winding center at a center thereof, the positive electrode multi-tab may include a plurality of tabs protruding from an upper surface of the electrode assembly and arranged in a line facing each other along surface-to-surface in one direction from the winding center, and the plurality of tabs may be bent in the direction of the winding center and welded to each other.

In the positive electrode multi-tab, a length of each of the respective tabs may gradually increase from the winding center to an outermost side of the electrode assembly.

The electrode assembly may have a winding center at a center thereof, the negative electrode multi-tab may include a plurality of tabs protruding from an upper surface of the electrode assembly and arranged in a line facing each other along surface-to-surface in one direction from the winding center, and the plurality of tabs may be bent in an outermost direction of the electrode assembly and welded to each other.

In the negative electrode multi-tab, a length of each of the respective tabs may gradually increase from an outermost side to the winding center of the electrode assembly.

The electrode assembly may have a winding center at a center thereof, and the positive electrode multi-tab and the negative electrode multi-tab may extend along a same line at opposite sides of the winding center of the electrode assembly.

A portion of a positive electrode uncoated portion in which an active material is not coated on the positive electrode plate may be removed to form the positive electrode multi-tab, and a portion of a negative electrode uncoated portion in which an active material is not coated on the negative electrode plate may be removed to form the negative electrode multi-tab.

The cylindrical secondary battery may further include: a plate-shaped positive lead tab electrically connecting the positive electrode multi-tab and the positive electrode terminal; and a plate-shaped negative lead tab electrically connecting the negative electrode multi-tab and the cap plate.

One side of the positive lead tab may be coupled to the positive electrode multi-tab by welding and another side thereof may be coupled to a lower end of the positive electrode terminal by welding. The positive lead tab may have a bent portion between the one side and the other side thereof.

One side of the negative lead tab may be coupled to a lower surface of the cap plate by welding and another side thereof may be coupled to the negative electrode multi-tab by welding. The negative lead tab may have a bent portion between the one side and the other side thereof.

The cylindrical secondary battery may further include a gasket between a through hole in the cap plate and the positive electrode terminal.

DETAILED DESCRIPTION

Figure 1:
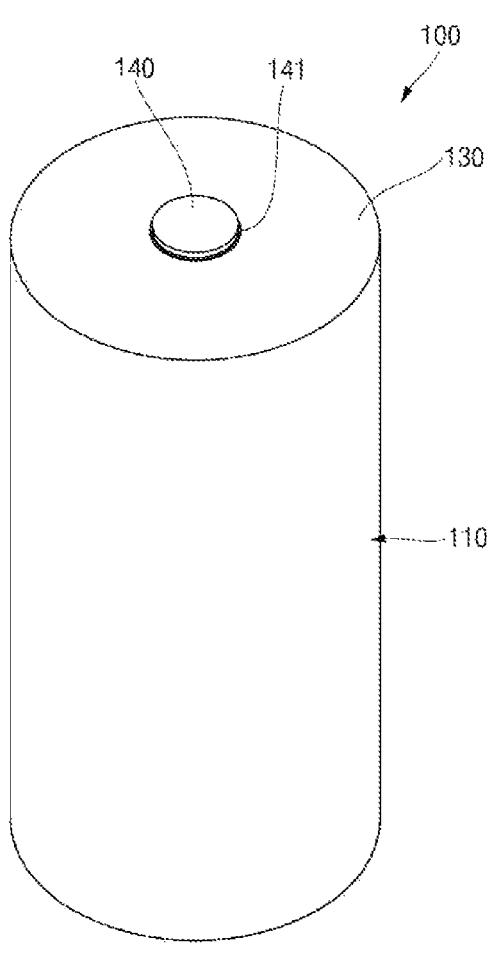
FIG. 1 is a perspective view of a cylindrical secondary battery according to an embodiment of the present disclosure.

Hereinafter, embodiments of the present disclosure are described, in detail, with reference to the accompanying drawings.

Embodiments of the present disclosure are provided to more completely explain the aspects and features of the present disclosure to those skilled in the art, and the following embodiments may be modified in various other forms. The present disclosure, however, may be embodied in many different forms and should not be construed as being limited to the embodiments described herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
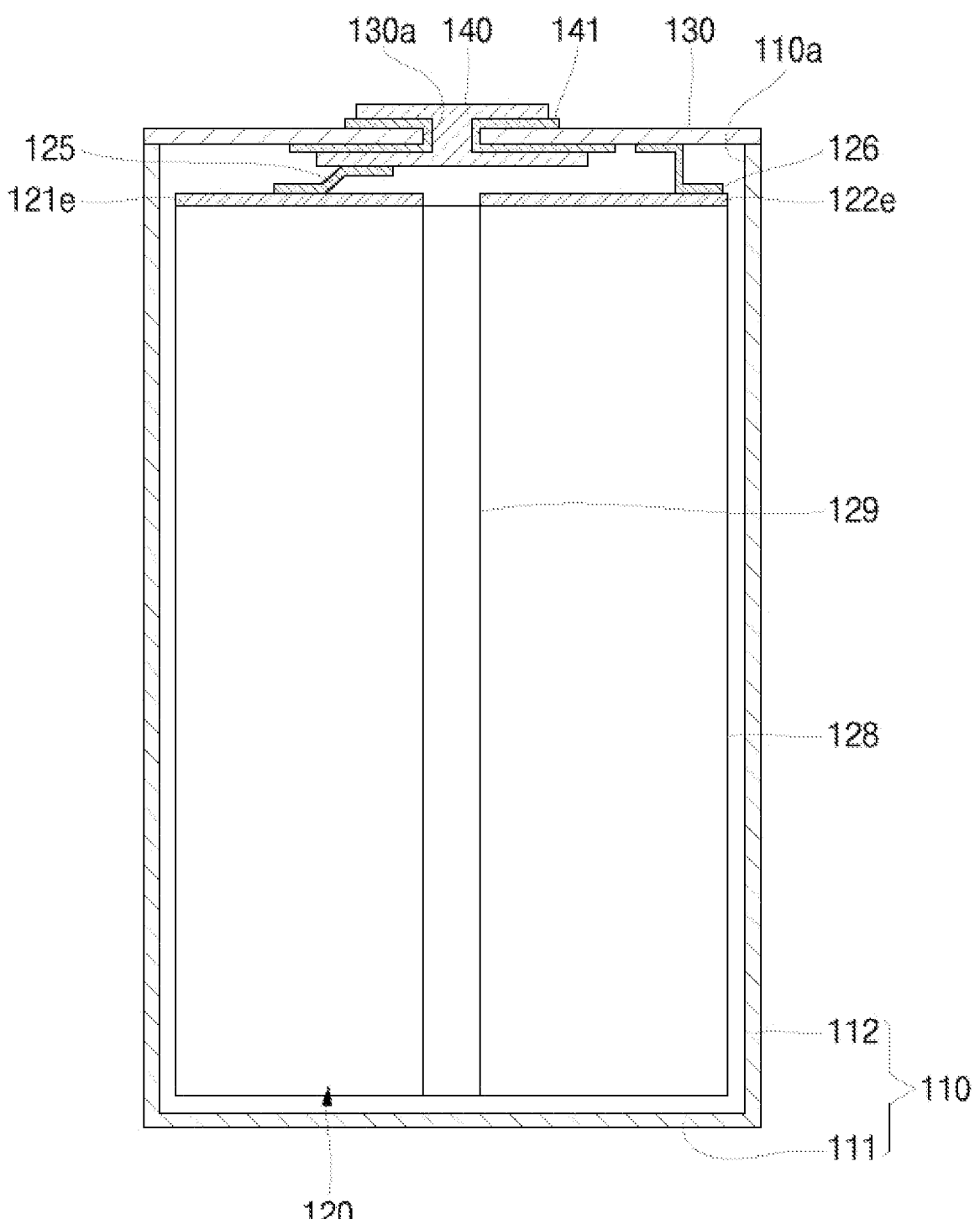
FIG. 2 is a cross-sectional view of the cylindrical secondary battery shown in FIG. 1.

As shown in FIGS. 1 and 2, which is a perspective view of a cylindrical secondary battery and a cross-sectional view of the cylindrical secondary battery, respectively. the cylindrical secondary battery 100 may include a cylindrical can 110, an electrode assembly 120 accommodated in the cylindrical can 110, a cap plate 130 sealing an upper opening 110*a* in the cylindrical can 110, and a positive electrode terminal 140 coupled at a terminal hole (e.g., a terminal opening) in the cap plate 130.

The cylindrical can 110 has a circular bottom portion 111 and a side portion 112 extending a length (e.g., a predetermined length) upwardly from the bottom portion 111. The cylindrical can 110 has an open top during the manufacturing process of the secondary battery 100. For example, the cylindrical can 110 has an opening 110*a* at an upper end thereof (e.g., at a distal end of the side portion 112), and the opening 110*a* (e.g., a periphery of the opening 110*a*) is a portion of the can 110 that is coupled to an edge of the cap plate 130.

During the manufacturing process of the secondary battery 100, the electrode assembly 120 may be inserted into the cylindrical can 110 through the opening 110*a* together with an electrolyte. After the electrolyte and the electrode assembly 120 are inserted into the cylindrical can 110, the cap plate 130 may be coupled to the opening 110*a* to seal the inside of the cylindrical can 110.

The can 110 may be made of steel, a steel alloy, aluminum, an aluminum alloy, nickel, a nickel alloy, or an equivalent thereof. In some embodiments, the can 110 is made of the same material as the cap plate 130.

The electrolyte allows lithium ions to move between the positive electrode plate 121 and the negative electrode plate 122. The electrolyte may be a non-aqueous organic electrolyte that is a mixture of a lithium salt and a high-purity organic solvent. In other embodiments, the electrolyte may be a polymer including (or using) a polymer electrolyte or a solid electrolyte, but the type of the electrolyte is not limited to these examples.

Figure 3:
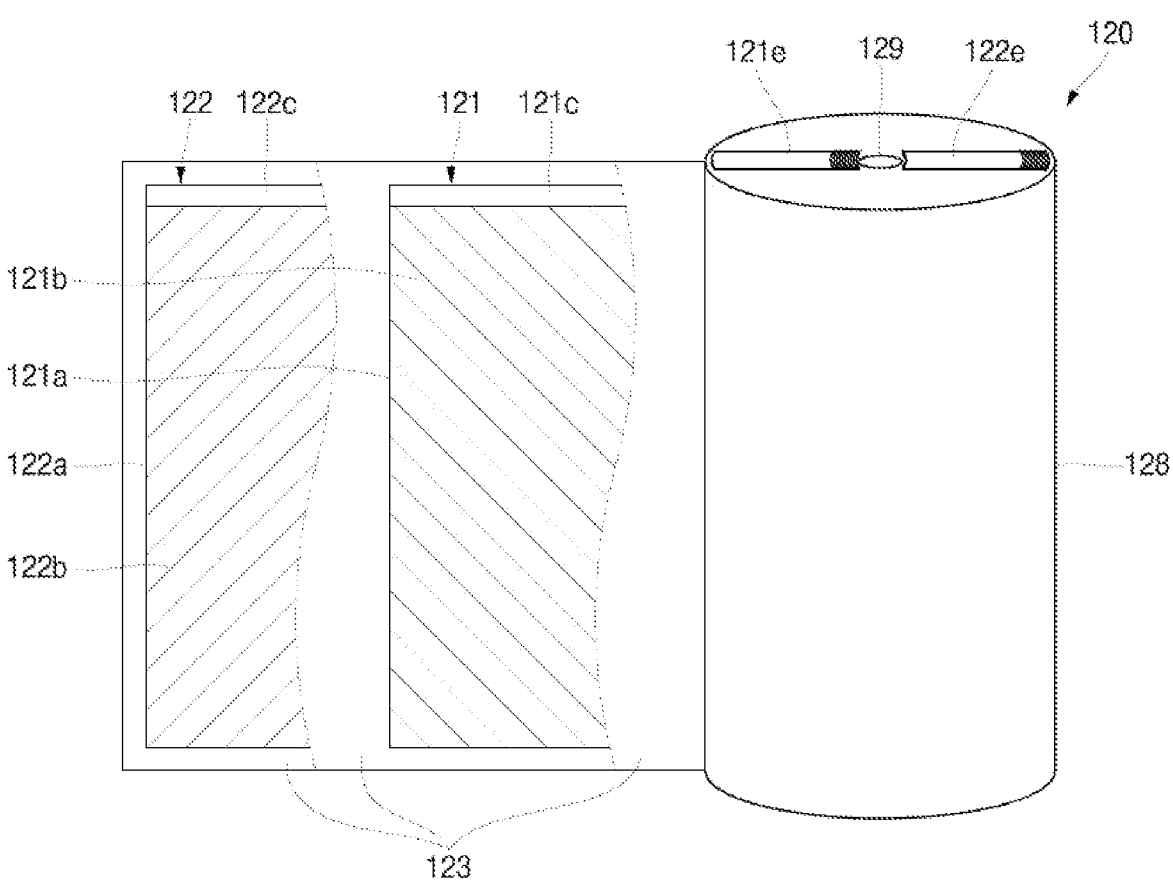
FIG. 3 is a partially exploded perspective view of an electrode assembly in the cylindrical secondary battery shown in FIGS. 1 and 2.
Figure 4:
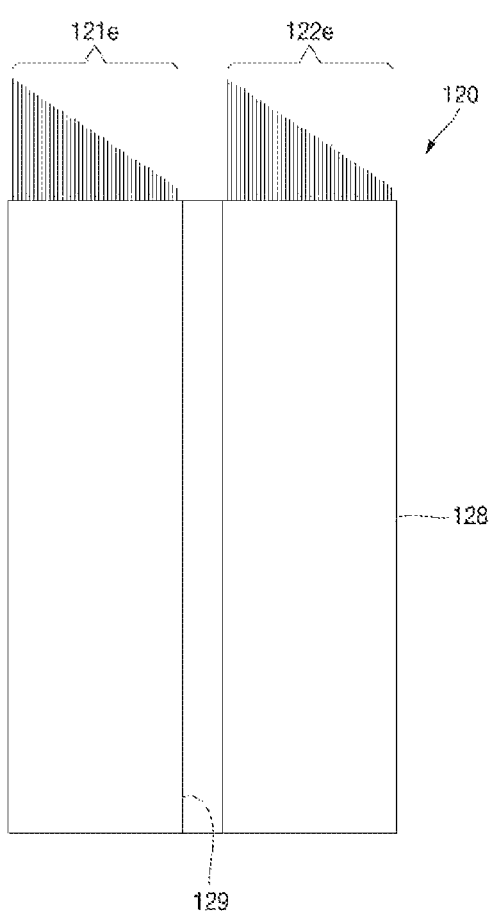
FIG. 4 is a cross-sectional view of the electrode assembly shown in FIG. 3 before a multi-tab is bent.

The configuration of the electrode assembly 120 will be described with reference to FIGS. 3 and 4, which is a partially exploded perspective view of the electrode assembly and a cross-sectional view of the electrode assembly before a multi-tab is bent, respectively.

The electrode assembly 120 includes a positive electrode plate 121 coated with a positive electrode active material, a negative electrode plate 122 coated with a negative electrode active material, and a separator 123 interposed between the positive electrode plate 121 and the negative electrode plate 122 to prevent a short circuit between the positive and negative electrode plates 121 and 122 while allowing lithium ions to move.

After the positive electrode plate 121, the negative electrode plate 122, and the separator 123 are stacked, the electrode assembly 120 is wound at a winding tip to have a substantially cylindrical shape. When the electrode assembly 120 is manufactured by a winding method (e.g., is wound), the electrode assembly 120 may include a winding center 129 (or winding tip) at the center where winding starts.

The positive electrode plate 121 includes a positive electrode coated portion 121*b* at where at least one surface of a positive electrode current collector plate 121*a*, which is a plate-shaped metal foil, such as aluminum or an aluminum alloy, is coated with a positive electrode active material made of a transition metal oxide and a positive electrode uncoated portion 121*c* that is not coated with the positive electrode active material. In addition, the positive electrode plate 121 may include a positive electrode multi-tab 121*e* extending outwardly (or upwardly) from the positive electrode uncoated portion 121*c* to be electrically connected to the positive electrode terminal 140. The positive electrode multi-tab 121*e* acts as a current passage between the positive electrode plate 121 and the positive electrode terminal 140 and is referred to as a multi-tab because a plurality of tabs are stacked together. The positive electrode multi-tab 121*e* may be formed by upwardly extending/protruding the positive electrode uncoated portion(s) 121*c*.

The negative electrode plate 122 includes a negative electrode coated portion 122*b* at where at least one surface of a negative electrode current collector plate 122*a*, which is a plate-shaped metal foil such as copper or nickel, is coated with a negative electrode active material made of a transition metal oxide and a negative electrode uncoated portion 122*c* that is not coated with the negative electrode active material. In addition, the negative electrode plate 122 may include a negative electrode multi-tab 122*e* extending outwardly (or upwardly) from the negative electrode uncoated portion 122*c* to be electrically connected to the cap plate 130. The negative electrode multi-tab 122*e* acts as a current passage between the negative electrode plate 122 and the cap plate 130 and is referred to as a multi-tab because a plurality of tabs are stacked. The negative electrode multi-tab 122*e* may be formed by upwardly extending/protruding the negative electrode uncoated portion(s) 122*c*.

The separator 123 may be made of polyethylene (PE) or polypropylene (PP), but the present disclosure is not limited thereto. The separator can prevent an electric short between the positive electrode plate 121 and the negative electrode plate 122 while allowing the movement of lithium ions therebetween. The separator 123 may have a larger length in the longitudinal direction of the electrode assembly 120 than the positive electrode plate 121 and the negative electrode plate 122. Accordingly, the separator 123 may be exposed at the upper and lower surfaces of the electrode assembly 120, and the positive electrode plate 121 and the negative electrode plate 122 may be positioned more inside than the separator 123. In other embodiments, the positive electrode multi-tab 121*e* and the negative multi-tab 122*e* may upwardly protrude from the separator 123 and may be exposed and extended outwardly from the upper surface of the electrode assembly 120.

The winding axis of the electrode assembly 120 may be substantially parallel or perpendicular to the terminal axis of the positive electrode terminal 140. In one embodiment, the winding axis of the electrode assembly 120 may be positioned on the same line as the terminal axis of the positive electrode terminal 140. In addition, in the electrode assembly 120, positive multi-tabs 121*e* may be positioned on one upper side of the winding center 129 and negative multi-tabs 122*e* may be positioned on the other upper side of the electrode assembly 120. For example, the positive electrode multi-tabs 121*e* and the negative multi-tabs 122*e* may be positioned to be symmetrical to each other with respect to the winding center 129.

The positive electrode multi-tabs 121*e* may be arranged in approximately one line so that tabs that are adjacent to each other in one direction face surface-to-surface with respect to the winding center 129. The negative electrode multi-tabs 122*e* may similarly be arranged in approximately one line so that tabs adjacent to each other in the other direction face surface-to-surface with respect to the winding center 129. In one embodiment, the positive electrode multi-tab 121*e* and the negative multi-tab 122*e* may be positioned on the same line at both sides of the winding center 129.

In the positive electrode multi-tab 121*e*, the tabs located on a side of the winding center 129 may be shorter than the tab located on an outermost side 128 of the electrode assembly 120. For example, in the positive electrode multi-tab 121*e*, the lengths of the tabs outwardly protruding from the winding center 129 may gradually increase. The positive multi-tab 121*e* may be bent from the outermost side 128 in the direction of the winding center 129. In addition, the positive electrode multi-tab 121*e* may have multiple tabs coupled to each other by welding. The positive electrode multi-tabs 121*e* may have lengths gradually increasing from the winding center 129 to the outermost side 128 and, thus, when bent in the direction from the outermost side 128 toward the winding center 129, the area where the multiple tabs contact and overlap each other may increase. Therefore, the positive electrode multi-tab 121*e* may easily transmit a high current by increasing the area at where the multiple tabs contact and overlap each other and may have improved heating (e.g., heat dissipation) characteristic by increasing the cross-sectional area. The positive electrode multi-tab 121*e* may be in contact with or spaced apart from the upper surface of one side of the electrode assembly 120. The positive electrode multi-tab 121*e* is positioned at one side with respect to the winding center 129 even when bent.

In the negative electrode multi-tab 122*e*, the tabs located on the side of (e.g., adjacent to) the winding center 129 may be longer than the tabs positioned on the outermost side 128 of the electrode assembly 120. For example, in the negative electrode multi-tab 122*e*, the lengths of the tabs outwardly protruding from the winding center 129 may gradually decrease. The negative electrode multi-tab 122*e* may be bent from the winding center 129 in the direction of the outermost side 128. In addition, the negative electrode multi-tab 122*e* may have multiple tabs coupled to each other by welding. The negative electrode multi-tab 122*e* may have lengths gradually decreasing from the winding center 129 to the outermost side 128 and, thus, when bent in the direction from the winding center 129 toward the outermost side 128, the area where the multiple tabs contact and overlap each other may increase. The negative electrode multi-tab 122*e* may easily transmit a high current by increasing the area at where the multiple tabs contact and overlap each other and may have improved heating (e.g., heat dissipation) characteristic by increasing the cross-sectional area. The negative electrode multi-tab 122*e* may be in contact with or spaced apart from the upper surface of the other side of the electrode assembly 120. The negative electrode multi-tab 122e may be positioned at the other side with respect to the winding center 129 even when bent and may not outwardly exposed or protruded through the outermost side 128.

The electrode multi-tabs 121e and 122e may be formed by partially removing the positive electrode uncoated portion 121c of the positive electrode plate 121 and the negative electrode uncoated portion 122c of the negative electrode plate 122 to form a pattern. The electrode multi-tabs 121e and 122e may be formed by partially removing, by notching, the positive electrode uncoated portion 121c of the positive electrode plate 121 and the negative electrode uncoated portion 122c of the negative electrode plate 122. For example, the electrode multi-tabs 121e and 122e are provided only on the upper surface of the electrode assembly 120 and are then bent in the upper surface direction of the electrode assembly 120, thereby increasing the capacity compared to a conventional electrode assembly having the same height.

The electrode assembly 120 may further include a positive electrode lead tab 125 electrically connecting the positive electrode multi-tab 121e and the positive electrode terminal 140 to each other and a negative electrode lead tab 126 electrically connecting the negative electrode multi-tab 122e and the cap plate 130 to each other. The positive electrode lead tab 125 acts as a current flow path between the positive electrode plate 121 and the positive electrode terminal 140 of the electrode assembly 120, and the negative electrode lead tab 126 acts as a current flow path between the negative electrode plate 122 of the electrode assembly 120 and the cap plate 130.

The positive electrode lead tab 125 may have a flat plate shape and may have one side coupled to the upper portion of the positive electrode multi-tab 121e by welding and the other side, opposite to one side, coupled to the lower portion of the positive electrode terminal 140 by welding. In the electrode assembly 120, the positive electrode lead tab 125 may be positioned on one side of the upper end with respect to the winding center 129 at where the positive electrode multi-tab 121e is positioned. The positive electrode lead tab 125 may have one side and the other side parallel or horizontal to each other. In some embodiments, the positive electrode lead tab 125 may have a bent portion between one side and the other side thereof. For example, one side of the positive electrode lead tab 125, which is welded to the positive electrode multi-tab 121e, may be positioned lower than the other side thereof, which is welded to the positive electrode terminal 140. The positive electrode lead tab 125 may be formed of a plate-shaped metal, such as aluminum.

The negative electrode lead tab 126 may have a flat plate shape and may have one side coupled to the lower portion of the cap plate 130 and the other side, opposite to the one side, welded to the upper portion of the negative electrode multi-tab 122e by welding. In the electrode assembly 120, the negative electrode lead tab 126 may be positioned on the other side of the upper end with respect to the winding center 129 at where the negative electrode multi-tab 122e is positioned. The negative electrode lead tab 126 may have one side and the other side parallel or horizontal to each other. In some embodiments, the negative electrode lead tab 126 may have a bent portion between one side and the other side thereof. For example, one side of the negative electrode lead tab 126, which is welded to the cap plate 130, may be positioned higher than the other side thereof, which is welded to the negative electrode multi-tab 122e. The negative electrode lead tab 126 may be formed of a plate-shaped metal, such as copper or nickel.

The cap plate 130 may have a flat circular shape and may have a terminal hole (e.g., a terminal opening) 130a passing through the center thereof. The positive electrode terminal 140 may be inserted and coupled at the terminal hole 130a in the cap plate 130. A gasket 141 for sealing and electrical insulation may be further interposed between the terminal hole 130a and the positive electrode terminal 140. The gasket 141 may block contact between the cap plate 130 and the positive electrode terminal 140 to ensure that they remain electrically separated. Also, the gasket 141 may be compressed between the positive electrode terminal 140 and the cap plate 130. The gasket 141 may seal the terminal hole 130a in the cap plate 130. The gasket 141 may be made of a resin material, such as polyethylene (PE), polypropylene (PP), polyethylene terephthalate (PET), or the like.

The cap plate 130 may be made of the same material as the cylindrical can 110. An edge of the cap plate 130 may be coupled at the upper opening 110a in the cylindrical can 110 to seal the cylindrical can 110. The edge of the cap plate 130 may be coupled at the upper opening 110a in the cylindrical can 110 by welding. The cap plate 130 may be electrically connected to the electrode assembly 120 through the negative electrode lead tab 126 and the negative electrode multi-tab 122e such that the cap plate 130 and the cylindrical can 110 have a negative polarity. That is, in some embodiments, the cap plate 130 may act as a negative electrode terminal and the secondary battery 100 may not have a separate negative electrode terminal.

The positive electrode terminal 140 may be inserted into the terminal hole 130a in cap plate 130 to be electrically connected to the positive electrode lead tab 125. The lower end of the positive electrode terminal 140 may be welded and coupled to the positive electrode lead tab 125. The positive electrode terminal 140 may be made of the same or similar material to the positive electrode lead tab 125, the positive electrode multi-tab 121e, and the positive electrode plate 121. A diameter of a portion of the positive electrode terminal 140 that is exposed above the upper portion of the cap plate 130 and a diameter of a portion thereof located below the cap plate 130 and inside the cylindrical can 110 may be larger than the diameter of a portion located inside terminal hole 130a in cap plate 130. For brevity, in the positive electrode terminal 140, the portion exposed above the upper portion of the cap plate 130 is referred to as the upper end of the positive electrode terminal 140, and the portion located below the cap plate 130 and facing the electrode assembly 120 is referred to as the lower end of the positive electrode terminal 140.

After the positive electrode terminal 140 is coupled at the terminal hole 130a in the cap plate 130 from the bottom to the top, the upper end thereof is compression-deformed (e.g., by compression molding) by a processing method such as pressing or spinning to then be closely adhered to the cap plate 130. After the positive electrode terminal 140 is coupled at the terminal hole 130a in the cap plate 130 from the top to the bottom, the lower end is compression-deformed (e.g., by compression molding) by a processing method such as pressing or spinning to then be closely adhered to the cap plate 130. The gasket 141 may be interposed between the positive electrode terminal 140 and the terminal hole 130a to electrically insulate the positive electrode terminal 140 and the cap plate 130 from each other and seal therebetween. The positive electrode terminal 140 may be electrically connected to the positive electrode plate 121 through the positive electrode lead tab 125.

In the cylindrical secondary battery 100, because the cap plate 130 acts as a negative electrode terminal and the positive electrode terminal 140 passes through the center of the cap plate 130, both the positive and negative electrode terminals may be positioned on the same surface of the secondary battery 100. In addition, because the cap plate 130 acts as a negative electrode terminal with its wide flat shape, the positive and negative terminals of multiple cylindrical secondary batteries 100 can easily be connected to each other by bus bars.

As described above, the cylindrical secondary battery, according to embodiments of the present disclosure, includes a negative electrode and a positive electrode each having wide flat portions (or shapes) on the same surface of the secondary battery, and thus, when a plurality of cylindrical secondary batteries are electrically connected by bus bars, the bus bars can be easily connected to the secondary batteries facilitated and the overall structure can be simplified.

In addition, in the cylindrical secondary battery, according to embodiments of the present disclosure, positive and negative electrode multi-tabs are provided on the same surface of an electrode assembly to improve capacity compared to conventional electrode assemblies of the same height, and, by increasing a contact area between tabs, high current transmission can be facilitated.

The foregoing embodiments are only some embodiments for carrying out the cylindrical secondary battery according to the present disclosure, which is not limited to the embodiment. Accordingly, it will be understood by a person skilled in the art that various changes in form and details may be made therein without departing from the spirit and scope of the present disclosure as defined by the following claims and their equivalents.

What is claimed is:

1. A cylindrical secondary battery comprising:
an electrode assembly comprising a positive electrode plate having a positive electrode multi-tab, a separator, and a negative electrode plate having a negative electrode multi-tab, the positive electrode plate, the separator, and the negative electrode plate being laminated and wound to have a winding center at a center thereof;
a cylindrical can accommodating the electrode assembly;
a cap plate coupled at an upper end of the cylindrical can and being electrically connected to the negative electrode multi-tab; and
a positive electrode terminal protruding upwardly through the cap plate and being electrically connected to the positive electrode multi-tab,
wherein the positive electrode multi-tab comprises a plurality of positive tabs protruding from an upper surface of the electrode assembly, each of the respective positive tabs being bent in a direction from an outermost side of the electrode assembly towards the winding center, a length of the respective positive tabs gradually increasing in a direction from the winding center toward the outermost side of the electrode assembly, and wherein the negative electrode multi-tab comprises a plurality of negative tabs protruding from the upper surface of the electrode assembly, each of the respective negative tabs being bent in the direction from the winding center towards the outermost side of the electrode assembly, a length of the respective negative tabs gradually increasing in the direction from the outermost side of the electrode assembly toward the winding center.

2. The cylindrical secondary battery of claim 1, wherein the plurality of positive tabs are arranged in a line facing each other along surface-to-surface in one direction from the winding center.

3. The cylindrical secondary battery of claim 1, wherein the plurality of negative tabs are arranged in a line facing each other along surface-to-surface in one direction from the winding center.

4. The cylindrical secondary battery of claim 1, wherein the positive electrode multi-tab and the negative electrode multi-tab extend along a same line at opposite sides of the winding center of the electrode assembly.

5. The cylindrical secondary battery of claim 1, a portion of a positive electrode uncoated portion in which an active material is not coated on the positive electrode plate is removed to form the positive electrode multi-tab, and
wherein a portion of a negative electrode uncoated portion in which an active material is not coated on the negative electrode plate is removed to form the negative electrode multi-tab.

6. The cylindrical secondary battery of claim 1, further comprising:
a plate-shaped positive lead tab electrically connecting the positive electrode multi-tab and the positive electrode terminal; and
a plate-shaped negative lead tab electrically connecting the negative electrode multi-tab and the cap plate.

7. The cylindrical secondary battery of claim 6, wherein one side of the positive lead tab is coupled to the positive electrode multi-tab by welding and another side thereof is coupled to a lower end of the positive electrode terminal by welding, and
wherein the positive lead tab has a bent portion between the one side and the other side thereof.

8. The cylindrical secondary battery of claim 6, wherein one side of the negative lead tab is coupled to a lower surface of the cap plate by welding and another side thereof is coupled to the negative electrode multi-tab by welding, and
wherein the negative lead tab has a bent portion between the one side and the other side thereof.

9. The cylindrical secondary battery of claim 1, further comprising a gasket between a through hole in the cap plate and the positive electrode terminal.

* * * * *